US011106848B2

(12) United States Patent
Cheng et al.

(10) Patent No.: US 11,106,848 B2
(45) Date of Patent: Aug. 31, 2021

(54) DIAGNOSTIC RESOLUTION ENHANCEMENT WITH REVERSIBLE SCAN CHAINS

(71) Applicant: Mentor Graphics Corporation, Wilsonville, OR (US)

(72) Inventors: Wu-Tung Cheng, Lake Oswego, OR (US); Szczepan Urban, Gowarzewo (PL); Jakub Janicki, Poznan (PL); Manish Sharma, Wilsonville, OR (US); Yu Huang, West Linn, OR (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 17/003,138

(22) Filed: Aug. 26, 2020

(65) Prior Publication Data
US 2021/0150111 A1    May 20, 2021

Related U.S. Application Data

(60) Provisional application No. 62/935,187, filed on Nov. 14, 2019.

(51) Int. Cl.
*G06F 30/333* (2020.01)
*G06F 11/08* (2006.01)
(Continued)

(52) U.S. Cl.
CPC ....... *G06F 30/333* (2020.01); *G01R 31/3177* (2013.01); *G01R 31/28* (2013.01);
(Continued)

(58) Field of Classification Search
CPC .............. G06F 30/333; G06F 2119/18; G06F 2119/02; G06F 11/008; G06F 11/261; G06F 11/27; G01R 31/3177; G01R 31/28
(Continued)

(56) References Cited

U.S. PATENT DOCUMENTS 6,327,687 B1   12/2001   Rajski et al.
6,353,842 B1   3/2002    Rajski et al.
(Continued)

FOREIGN PATENT DOCUMENTS

WO   WO-2008093312 A1 *  8/2008  ..... G01R 31/318508

OTHER PUBLICATIONS

Anonymous, Patent Document No. RD 432023 A, published Apr. 10, 2000, abstract only. (Year: 2000).*
(Continued)

*Primary Examiner* — Phallaka Kik

(57) ABSTRACT

This application discloses a computing system implementing an automatic test pattern generation tool can generate test patterns to apply to a reversible scan chain in an integrated circuit. The reversible scan chain can be configured to serially load and unload the test patterns in multiple directions to generate test responses. The computing system can implement a defect diagnosis tool to detect a presence of a suspected defect associated with the reversible scan chain based on the test responses, identify which of the multiple directions used to load and unload the test patterns corresponds to the suspected defect in the reversible scan chain based on the test responses, and determine a portion of the integrated circuit to inspect for a manufacturing fault corresponding to the suspected defect based, at least in part, on the identification of which of the multiple directions corresponds to the suspected defect in the reversible scan chain.

20 Claims, 11 Drawing Sheets

(51) Int. Cl.
  G06F 11/27 (2006.01)
  G06F 11/26 (2006.01)
  G01R 31/28 (2006.01)
  G01R 31/3177 (2006.01)
  *G06F 119/18* (2020.01)
  *G06F 119/02* (2020.01)
  *G06F 11/00* (2006.01)
(52) U.S. Cl.
  CPC .......... *G06F 11/008* (2013.01); *G06F 11/261* (2013.01); *G06F 11/27* (2013.01); *G06F 2119/02* (2020.01); *G06F 2119/18* (2020.01)
(58) Field of Classification Search
  USPC ......... 716/136, 54, 52; 700/110; 714/30, 33, 714/727, 733, 734
  See application file for complete search history.

(56) References Cited

U.S. PATENT DOCUMENTS

| | | | |
|---|---|---|---|
| 6,539,409 B2 | 3/2003 | Rajski et al. | |
| 6,543,020 B2 | 4/2003 | Rajski et al. | |
| 6,557,129 B1 | 4/2003 | Rajski et al. | |
| 6,684,358 B1 | 1/2004 | Rajski et al. | |
| 6,708,192 B2 | 3/2004 | Rajski et al. | |
| 6,829,740 B2 | 12/2004 | Rajski et al. | |
| 6,874,109 B1 | 3/2005 | Rajski et al. | |
| 7,007,214 B2* | 2/2006 | Eustis | G01R 31/31855 714/729 |
| 7,093,175 B2 | 8/2006 | Rajski et al. | |
| 7,111,209 B2 | 9/2006 | Rajski et al. | |
| 7,260,591 B2 | 8/2007 | Rajski et al. | |
| 7,263,641 B2 | 8/2007 | Rajski et al. | |
| 7,478,296 B2 | 1/2009 | Rajski et al. | |
| 7,493,540 B1 | 2/2009 | Rajski et al. | |
| 7,496,816 B2* | 2/2009 | Bartenstein | G01R 31/318566 714/726 |
| 7,500,163 B2 | 3/2009 | Rajski et al. | |
| 7,506,232 B2 | 3/2009 | Rajski et al. | |
| 7,509,546 B2 | 3/2009 | Rajski et al. | |
| 7,523,372 B2 | 4/2009 | Rajski et al. | |
| 7,653,851 B2 | 1/2010 | Rajski et al. | |
| 7,788,561 B2 | 8/2010 | Huang et al. | |
| 8,316,265 B2 | 11/2012 | Guo et al. | |
| 8,615,965 B2 | 12/2013 | Kryger et al. | |
| 8,689,070 B2 | 4/2014 | Huang et al. | |
| 8,843,796 B2 | 9/2014 | Cheng et al. | |
| 9,086,459 B2 | 7/2015 | Guo et al. | |
| 9,222,978 B2 | 12/2015 | Huang et al. | |
| 2004/0268195 A1* | 12/2004 | Eustis | G01R 31/31855 714/726 |
| 2007/0220384 A1* | 9/2007 | Bartenstein | G01R 31/318566 714/726 |
| 2020/0333398 A1* | 10/2020 | Huang | G01R 31/318569 |

OTHER PUBLICATIONS

Rajski, Janusz et al., "Embedded Deterministic Test", IEEE Transactions On Computer-Aided Design of Integrated Circuits and Systems, vol. 23, No. 5, May 2004, pp. 776-792.

Moghaddam, Elham et al., "Test Point Insertion in Hybrid Test Compression/LBIST Architectures", International Test Conference, IEEE Paper 2.1, Nov. 2016, pp. 1-10.

Huang, Yu et al., "Survey of Scan Chain Diagnosis", Silicon Debug and Diagnosis, IEEE Design & Test Computers, vol. 25, Issue 3, May 2008, pp. 240-248.

Huang, Yu et al., "On Designing Two-Dimensional Scan Architecture for Test Chips", IEEE, International Symposium on VLSI Design, Automation and Test, Apr. 2017, pp. 1-4.

Huang, Yu et al., "Reversible Scan Based Diagnostic Patterns", IEEE, 2019 International Symposium on VLSI Design, Automation and Test (VLSI-DAT), Jun. 2019, pp. 1-4.

Authors et al., "Bidirectional Scan Chain for Digital Circuit Testing", IP.com No. IPCOM000160595D, Nov. 21, 2007.

* cited by examiner

DIAGNOSTIC RESOLUTION ENHANCEMENT WITH REVERSIBLE SCAN CHAINS

RELATED APPLICATION

This patent application claims priority to U.S. Provisional Patent Application No. 62/935,187, filed Nov. 14, 2019, which is incorporated by reference herein.

TECHNICAL FIELD

This application is generally related to electronic design automation and, more specifically, to defect diagnosis with reversible scan chains to enhance diagnostic resolution.

BACKGROUND

Since defects in integrated circuits can be introduced during manufacturing, manufacturers often test integrated circuit chips to identify faults and diagnose defects in the integrated circuit chips. Integrated circuit testing typically includes applying a set of test stimuli or test patterns to a circuit-under-test and then analyzing responses generated by the circuit-under-test. To make it easier to develop and apply test patterns, certain testability features can be added to integrated circuit designs, referred to as design for test or design for testability (DFT). In a design for test scheme, called scan chain testing, sequential state elements in integrated circuit designs, for example, latches, flip-flops, or the like, can be made controllable and observable via a serial interface. For example, the sequential state elements can be replaced with dual-purpose state elements, called scan cells, which can be connected together to form scan chains acting as serial shift registers for shifting in test patterns and shifting out test responses.

A defect diagnosis process can utilize the scan chains to identify suspected defects and isolate them to particular locations in an integrated circuit chip, for example, by applying test patterns to the scan chains, applying a fail model to the output of the scan chains to generate a fail log, and then analyzing the fail log to locate the suspected defects. A physical failure analysis (PFA) process can be performed to determine whether the suspected defects correspond to actual defects by physically inspecting integrated circuit chips, usually by etching away certain layers of the integrated circuit chips and then imaging the silicon surface using electronic microscopy or focused ion beams. The number of actual defects determined during the PFA process relative to a number of suspected defects identified during defect diagnosis can correspond to a diagnosis resolution associated with the defect diagnosis process.

One hardware-based diagnosis technique used to increase defect resolution can modify the scan chain into a reversible scan chain architecture, which can allow a scan chain to load and unload test patterns from left-to-right or from right-to-left. The reversible scan chain architecture can allow Automatic Test Equipment (ATE) to load and unload test patterns in a U-turn process, for example, loading the test patterns from left-to-right and unloading them from right-to-left. This U-turn process can allow the defect diagnosis process to narrow-down locations of any defects in the scan chain, as an analysis of the unloaded test patterns applied using the U-turn process can identify a right-most and/or a left-most location of defects in the scan chain. Even with the reversible scan chain architecture and the use of the U-turn loading and unloading process, however, the suspected defects usually correspond to a significant die area, rendering the PFA process laborious and time-consuming.

SUMMARY

This application discloses a computing system implementing an automatic test pattern generation tool can generate test patterns to apply to a reversible scan chain in an integrated circuit. The reversible scan chain can be configured to serially load and unload the test patterns in multiple directions to generate test responses. The computing system can implement a defect diagnosis tool to detect a presence of a suspected defect associated with the reversible scan chain based on the test responses, identify which of the multiple directions used to load and unload the test patterns corresponds to the suspected defect in the reversible scan chain based on the test responses, and determine a portion of the integrated circuit to inspect for a manufacturing fault corresponding to the suspected defect based, at least in part, on the identification of which of the multiple directions corresponds to the suspected defect in the reversible scan chain. Embodiments of will be described below in greater detail.

DESCRIPTION OF THE DRAWINGS

FIGS. 5A-4D illustrate example test pattern loading and unloading in a reversible scan chain according to various embodiments.

DETAILED DESCRIPTION

Illustrative Operating Environment

Figure 1:
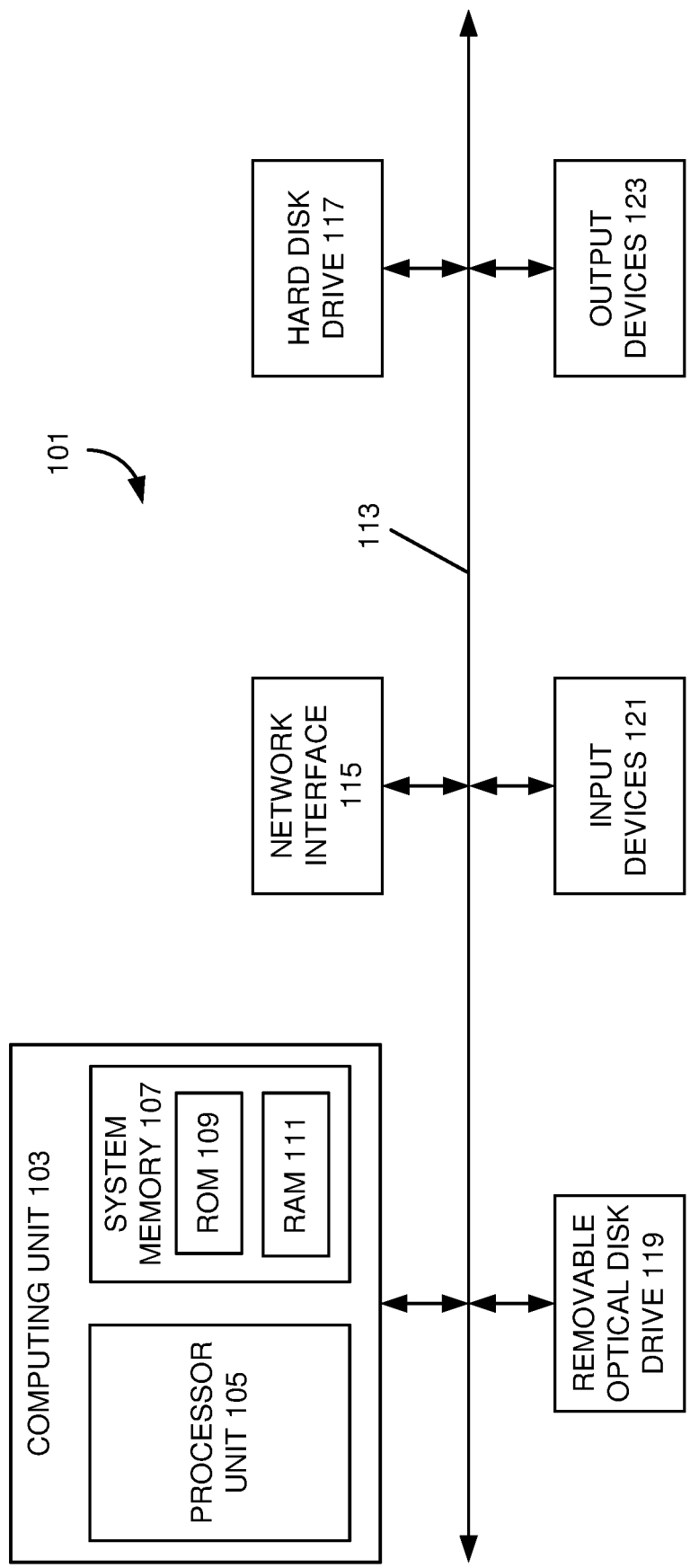
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, through a bus 113 or alternate communication structure, to one or more peripheral devices 115-123. For example, the processor unit 105 or the system memory 107 may be directly or indirectly connected to one or more additional memory storage devices, such as a hard disk drive 117, which can be magnetic and/or removable, a removable optical disk drive 119, and/or a flash memory card. The processor unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
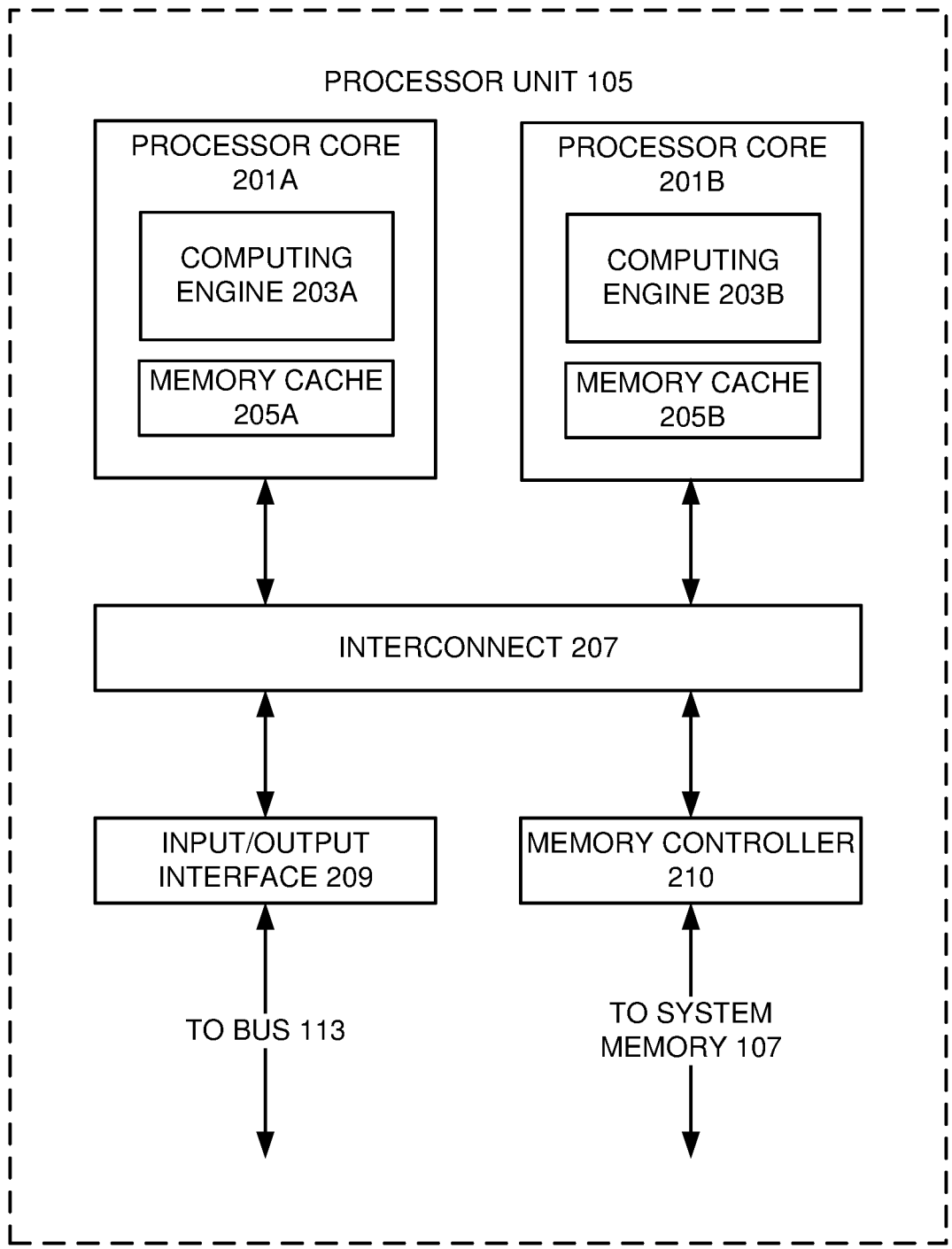

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Defect Diagnosis with Reversible Scan Chains

Figure 3:
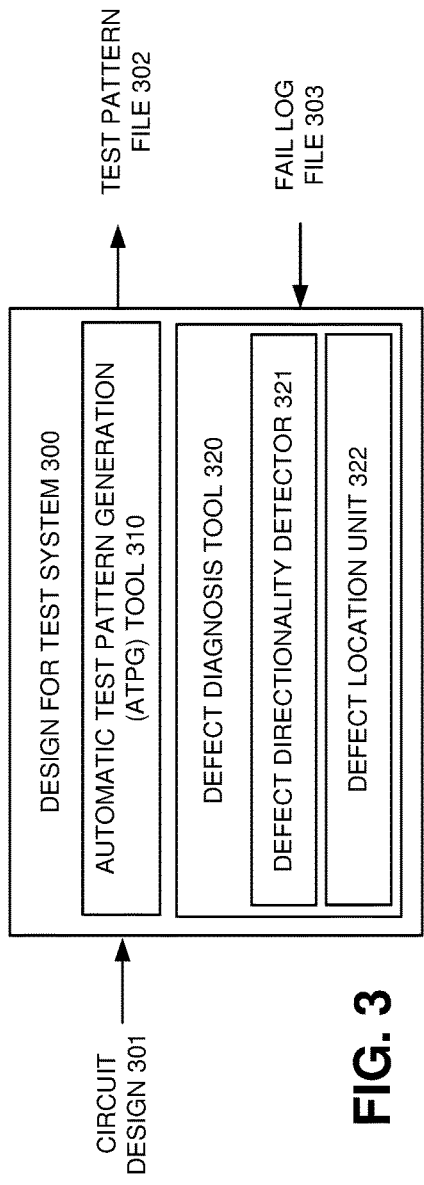
FIG. 3 illustrates an example design for test system including an automatic test pattern generation (ATPG) tool and a defect diagnosis tool to detect lane-dependent defects in a reversible scan chain that may be implemented according to various embodiments.

FIG. 3 illustrates an example design for test system 300 including an automatic test pattern generation (ATPG) tool 310 and a defect diagnosis tool 320 to detect lane-dependent defects in a reversible scan chain that may be implemented according to various embodiments. Referring to FIG. 3, the design for test system 300 can receive a circuit design 301 that describes an integrated circuit in a netlist format, which can include multiple electronic circuits, for example, latches, flip-flops, registers, inverters, multiplexers, or the like, and describe interconnections between the electronic circuits. The circuit design 301 also includes design for test circuitry, such as reversible scan chains, which can be serially and bi-directionally loaded and unloaded with test patterns to detect a presence of defects, such as a stuck-at 0 fault defect, a stuck-at 1 fault defect, a slow clock defect, a set-up timing defect, a hold timing defect, or the like, in a manufactured integrated circuit. Embodiments of a reversible scan chain will be described below with reference to FIGS. 4A-4C.

Figure 4A:
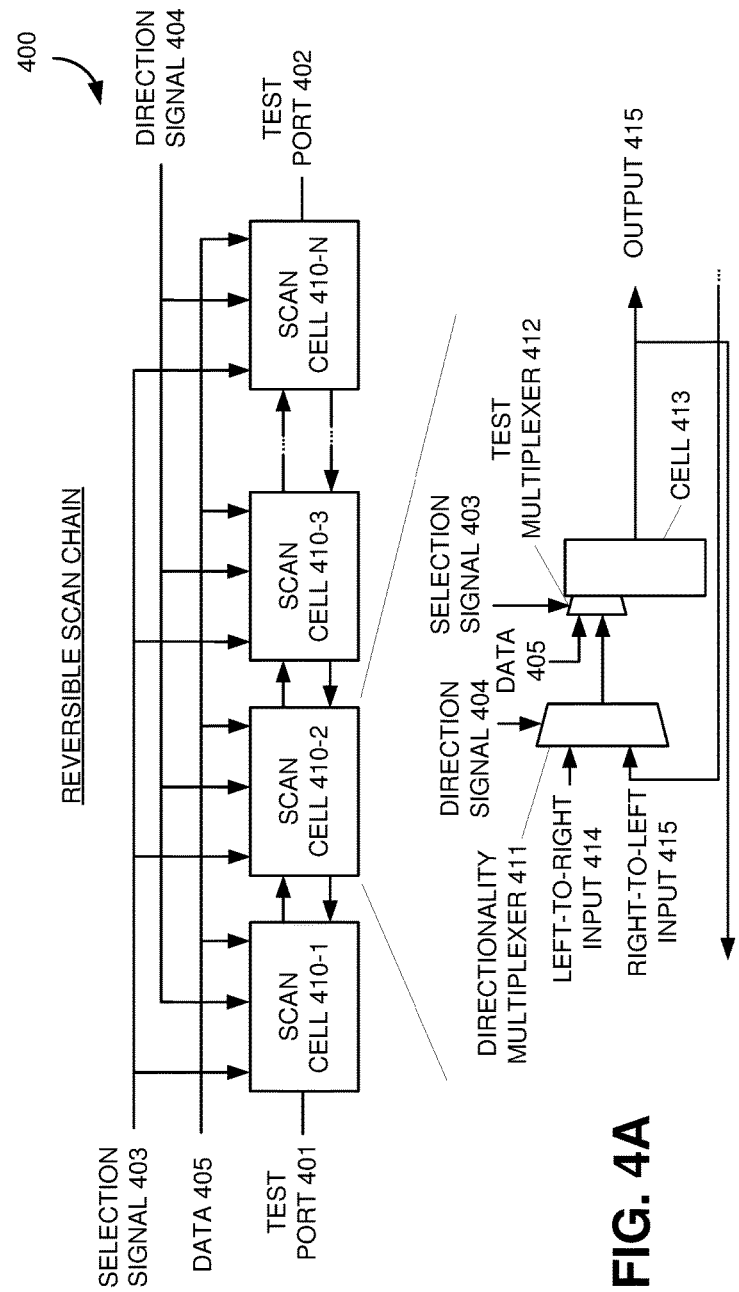
FIGS. 4A-4C illustrate an example architecture for a reversible scan chain according to various embodiments.
Figure 4B:
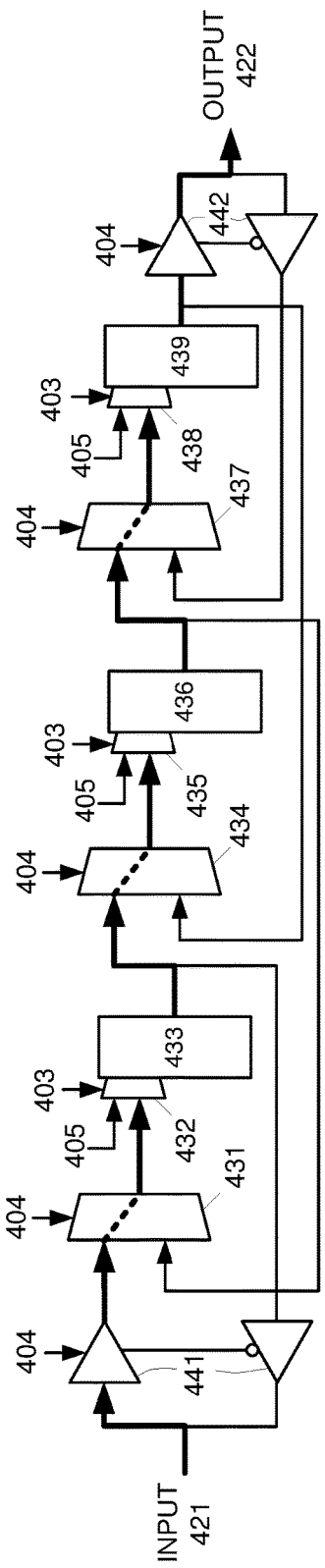
Figure 4C:
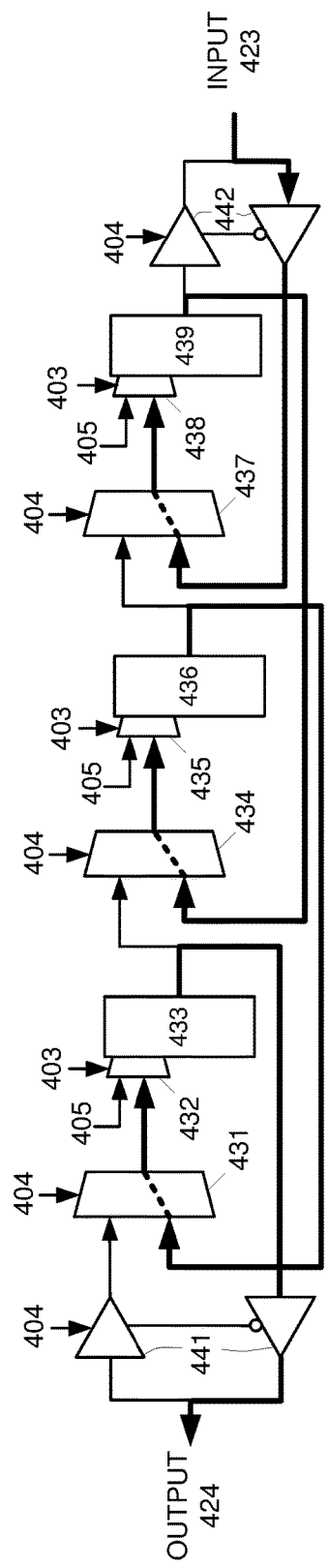

FIGS. 4A-4C illustrate an example architecture for a reversible scan chain 400 according to various embodiments. Referring to FIG. 4A, the reversible scan chain 400 can include scan cells 410-1 to 410-N, arranged serially between test ports 401 and 402, for example, to implement a shift register for loading test patterns to the reversible scan chain 400 and unloading test responses from the reversible scan chain 400. Each of the scan cells 410-1 to 410-N can include a cell 413 to receive input from a test multiplexer 412 based on a selection signal 403, which can set the scan cells 410-1 to 410-N into a functional mode or a test mode. In the functional mode, the cell 413 in the scan cells 410-1 to 410-N can select data 405 as input and generate an output 415.

In the test mode, the cell 413 in each of the scan cells 410-1 to 410-N can receive test pattern values as input from directionality multiplexer 411. The directionality multiplexer 411 can receive multiple test values from adjacent scan cells or one of the test ports 401 or 402, and select one of the test values as output to the test multiplexer 412 based on a direction signal 404. For example, the directionality multiplexer 411 in scan cell 410-2 can select between a left-to-right input 414 received from an adjacent scan cell 410-1 and a right-to-left input 415 received from an adjacent scan cell 410-3 based on the direction signal 404. The cell 413, in the test mode, can receive the left-to-right input 414 or the right-to-left input 415 selected by the directionality multiplexer 411 and then shift the received input to the output 415. Embodiments of loading or unloading the reversible scan chain 400 will be described below in greater detail.

Referring to FIG. 4B, a left-to-right shift in a 3-cell reversible scan chain is shown. The reversible scan chain can receive a test pattern at an input 421 and serially shift bits in the test pattern into cells 433, 436, and 439 towards an output 422. The reversible scan can propagate the test pattern received at the input 421 to a buffer 441. The buffer 441, in response to the direction signal 404, can serially provide values of the test pattern to a directionality multiplexer 431. The directionality multiplexer 431, in response to the direction signal 404, can provide the test pattern to the test multiplexer 432. The test multiplexer 432, in response to a selection signal 403, can provide the test pattern to a cell 433.

The cell 433 can shift the test pattern to a directionality multiplexer 434 that, in response to the direction signal 404, can provide the test pattern to the test multiplexer 435. The test multiplexer 435, in response to a selection signal 403, can provide the test pattern to a cell 436. The cell 436 can shift the test pattern to a directionality multiplexer 437 that, in response to the direction signal 404, can provide the test pattern to the test multiplexer 438. The test multiplexer 438, in response to a selection signal 403, can provide the test pattern to a cell 439. The cell 439 can shift the test pattern to a buffer 442 that, in response to the direction signal 404, can shift the test pattern to an output 422.

Referring to FIG. 4C, a right-to-left shift in a 3-cell reversible scan chain is shown. The reversible scan chain can receive a test pattern at an input 423 and serially shift bits in the test pattern into cells 439, 436, and 432 towards an output 424. The reversible scan chain can propagate the test pattern received at the input 423 to a buffer 442. The buffer 442, in response to the direction signal 404, can serially provide values of the test pattern to a directionality multiplexer 437. The directionality multiplexer 437, in response to the direction signal 404, can provide the test pattern to the test multiplexer 438. The test multiplexer 438, in response to a selection signal 403, can provide the test pattern to a cell 439.

The cell 439 can shift the test pattern to a directionality multiplexer 434 that, in response to the direction signal 404, can provide the test pattern to the test multiplexer 435. The test multiplexer 435, in response to a selection signal 403, can provide the test pattern to a cell 436. The cell 436 can shift the test pattern to a directionality multiplexer 431 that, in response to the direction signal 404, can provide the test pattern to the test multiplexer 432. The test multiplexer 432, in response to a selection signal 403, can provide the test pattern to a cell 433. The cell 433 can shift the test pattern to a buffer 441 that, in response to the direction signal 404, can shift the test pattern to an output 424.

Referring back to FIG. 3, the design for test system 300 includes the ATPG tool 310 to generate a test pattern file 302 based, at least in part, on the circuit design 301. The test pattern file 302 can identify test patterns to be serially loaded into and unloaded from one or more reversible scan chains in an integrated circuit. For example, when attempting to determine a presence of a stuck-at 0 defect, the ATPG tool 310 can generate test patterns having values of "1" shifted through the reversible scan chain. When attempting to determine a presence of a stuck-at 1 defect, the ATPG tool 310 can generate test patterns having values of "0" shifted through the reversible scan chain.

The test pattern file 302 also can identify a directionality of the loading of each test pattern and the unloading of each test pattern. The test pattern file 302 can prompt the test patterns to be loaded and unloaded from the manufactured integrated circuit in a U-turn process. For example, the test pattern file 302 can direct Automatic Test Equipment (ATE) to load a test pattern into a reversible scan chain of the manufactured integrated circuit and have the reversible scan chain shift the test pattern from left-to-right before unloading the test pattern from the reversible scan chain by shifting out a test response from right-to-left. The test pattern file 302 also can prompt the test patterns to be loaded and unloaded from the manufactured integrated circuit in a flush process. For example, the test pattern file 302 can direct the ATE to load a test pattern into a reversible scan chain of the manufactured integrated circuit and have the reversible scan chain shift the test pattern from left-to-right before unloading the test pattern from the reversible scan chain by shifting out a test response from left-to-right. Embodiments of the U-turn process and the flush process will be described below in greater detail.

The design for test system 300 includes the defect diagnosis tool 320 to receive a fail log file 303, for example, from the ATE having applied the test patterns described in the test pattern file 302. In some embodiments, the fail log file 303 can include a list of test responses unloaded from a reversible scan chain that differ from the test patterns applied to a manufactured integrated circuit.

The defect diagnosis tool 320 can analyze the fail log file 303 to ascertain which of the test responses indicate a presence of at least one suspected defect in the manufactured integrated circuit associated with a reversible scan chain. In some embodiments, the defect diagnosis tool 320 can determine a left-most and a right-most scan cell in the reversible scan chain corresponding to the suspected defect using responses from test patterns applied to the reversible scan chain in a U-turn process, such as a left-to-right-to-left U-turn process and a right-to-left-to-right U-turn process. For example, a left-to-right-to-left U-turn process can load a test pattern to a reversible scan chain by shifting the test pattern left-to-right into the reversible scan chain and can unload a test response from right-to-left in the reversible scan chain. The left most difference in bit value between the test pattern and the test response can correspond to a left most scan cell associated with the suspected defect.

The defect diagnosis detector 321 can include a defect directionality detector 321 to determine a failure directionality type for the suspected defect associated with the reversible scan chain. The failure directionality type can correspond to a right-to-left single lane failure when the suspect defect occurs only when the test pattern was shifted right-to-left in the reversible scan chain. The failure directionality type can correspond to a left-to-right single lane failure meaning the suspect defect occurs only when the test pattern was shifted left-to-right in the reversible scan chain. The failure directionality type can correspond to a dual-lane failure meaning the suspect defect occurs when the test pattern was shifted left-to-right and right-to-left in the reversible scan chain.

In some embodiments, the defect directionality detector 321 can analyze test responses from test patterns applied to the reversible scan chain in a flush process, such as a left-to-right flush process and a right-to-left flush process.

For example, a left-to-right flush process can load a test pattern from left-to-right into the reversible scan chain and unload a test response from the reversible scan chain by shifting it through scan cells left-to-right. Similarly, a right-to-left flush process can load a test pattern from right-to-left into the reversible scan chain and unload a test response from the reversible scan chain by shifting it through scan cells right-to-left. When a test response differs from a test pattern applied to the reversible scan chain using one or more of the flush processes, the defect directionality detector 321 can determine a suspected defect associated with the reversible scan chain has a directionality corresponding to a direction of the flush process.

When the defect directionality detector 321 determines a suspect defect can be detected with only one of the flush processes, for example, the left-to-right flush process or the right-to-left flush process, the failure directionality type for the suspected defect can be a single-lane failure. When the defect directionality detector 321 determines a suspect defect can be detected with both of the flush processes, for example, the left-to-right flush process and the right-to-left flush process, the failure directionality type for the suspected defect can be a dual-lane failure. Embodiments of test pattern loading and unloading in a reversible scan chain and detecting suspected defects and their associated directionality will be described below with reference to FIGS. 5A-5D.

Figure 5A:
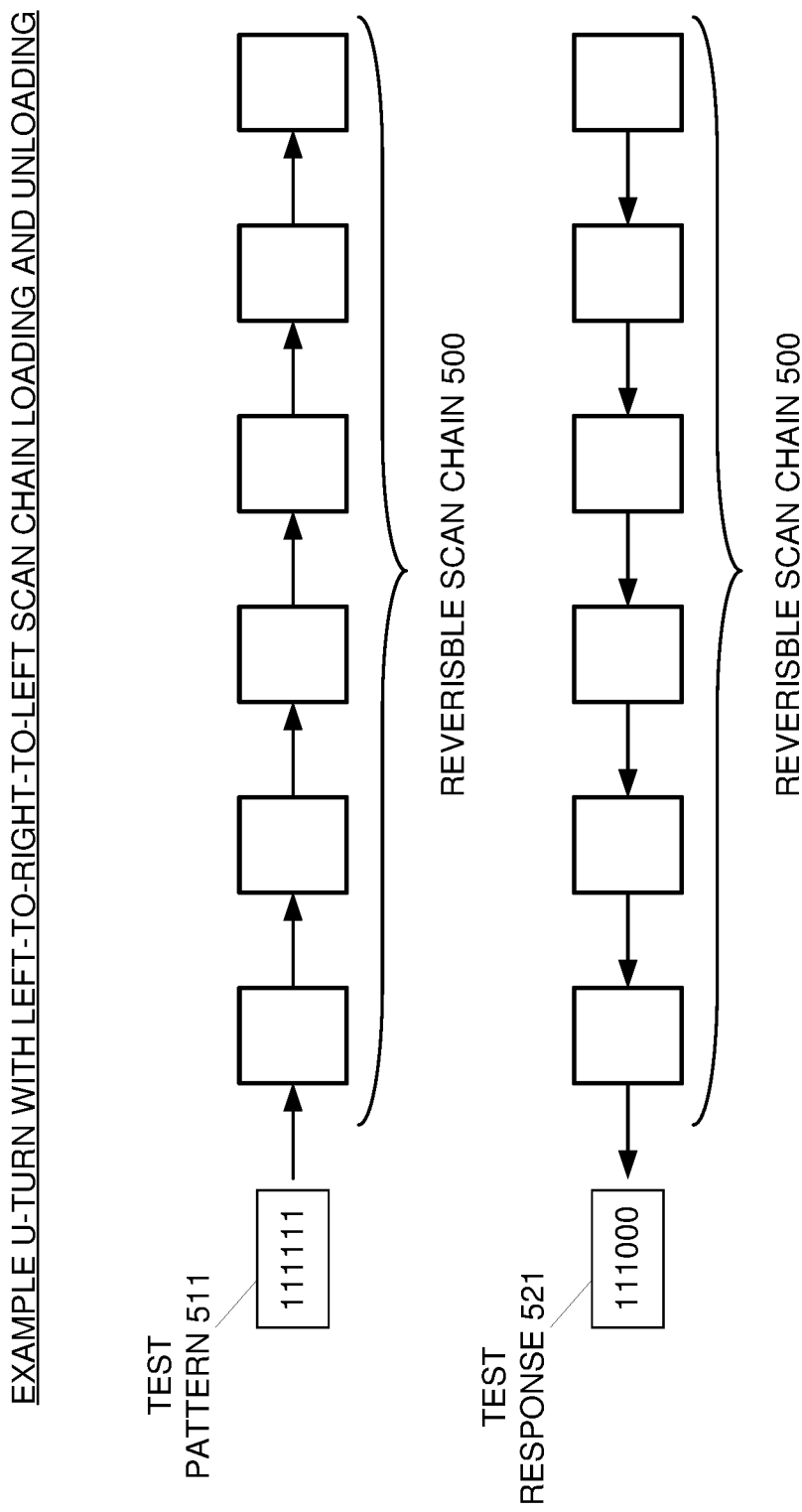

FIGS. 5A-5D illustrate example test pattern loading and unloading in a reversible scan chain 500 according to various embodiments. Referring to FIG. 5A, the reversible scan chain 500 can be loaded and unloaded with a left-to-right-to-left U-turn process, which loads a test pattern 511 from left-to-right into the reversible scan chain 500 and unloads a test response 521 from right-to-left in the reversible scan chain 500.

In this example, the reversible scan chain 500 can include six scan cells arranged in a bidirectional shift register configuration. The reversible scan chain 500 can receive the test pattern 511, for example, a "111111" pattern, and serially shift the test pattern 511 from scan cell-to-scan cell to load the reversible scan chain 500. If the reversible scan chain 500 were defect-free, each of the scan cells in the reversible scan chain 500 would store a "1" from the test pattern 511 loaded into the reversible scan chain 500.

The reversible scan chain 500 can unload the test pattern 511 by serially shifting out a test response 521 from right-to-left. In this example, the test response 521 can correspond to a "111000" pattern, indicating at least one stuck-at 0 defect exists in the reversible scan chain 500 and that the left-most location of the stuck-at 0 defect corresponds to a region associated with the third and the fourth scan cells.

Figure 5B:
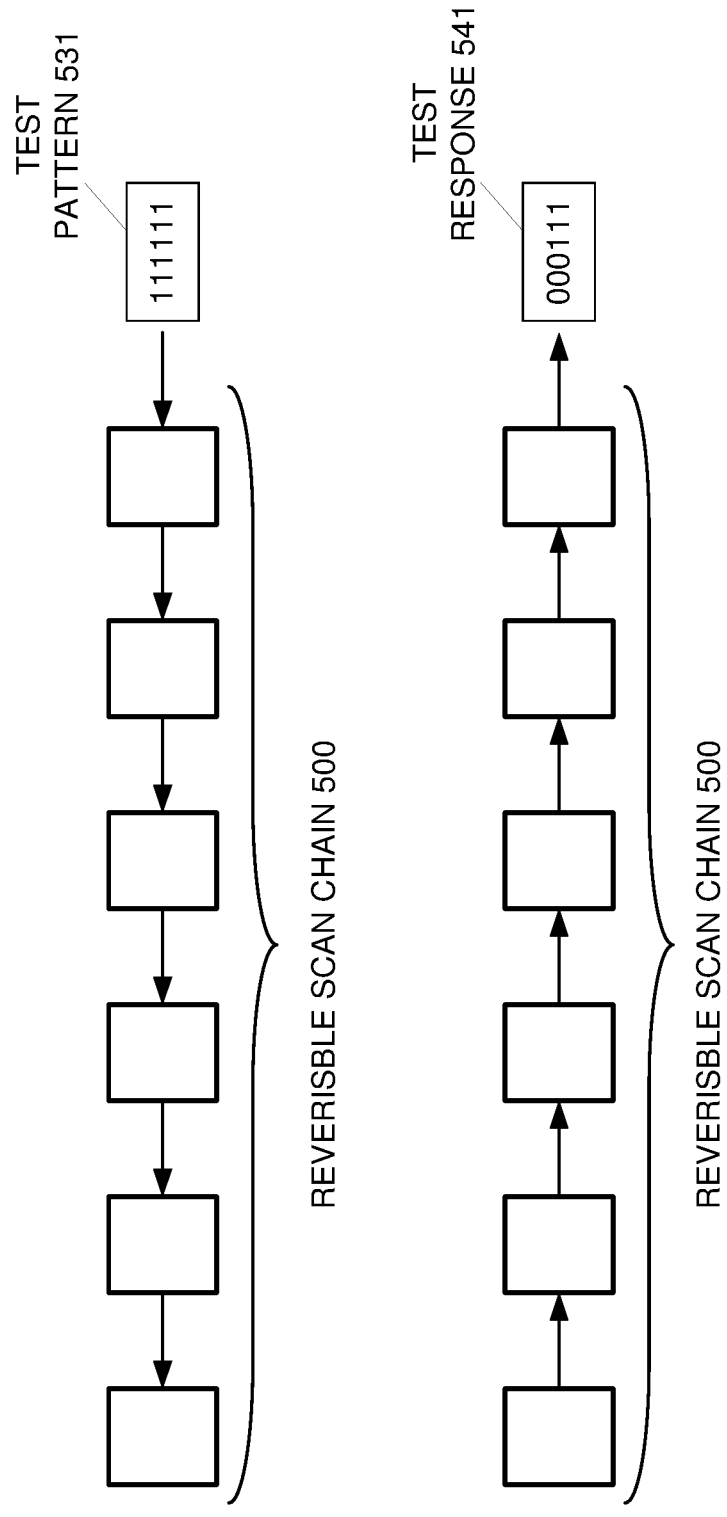

Referring to FIG. 5B, the reversible scan chain 500 can be loaded and unloaded with a right-to-left-to-right U-turn process, which loads a test pattern 531 from right-to-left into the reversible scan chain 500 and unloads a test response 541 from left-to-right in the reversible scan chain 500. The reversible scan chain 500 can receive the test pattern 531, for example, a "111111" pattern, and serially shift the test pattern 511 from scan cell-to-scan cell to load the reversible scan chain 500. The reversible scan chain 500 can unload the test pattern 531 by serially shifting out a test response 541 from left-to-right. In this example, the test response 541 can correspond to a "000111" pattern, indicating at least one stuck-at 0 defect exists in the reversible scan chain 500 and that the right-most location of the stuck-at 0 defect corresponds to a region associated with the third and the fourth scan cells.

By utilizing the test response 521 from FIG. 5A and the test response 541 from FIG. 5B, a presence of one or more suspected defects in the reversible scan chain can be detected and a location of the suspected defect(s) can be limited to a region between the left-most location and the right-most location determined by the two U-turn processes. Since the suspected defect identified by these test responses can be due to a fault in the third scan cell, the fourth scan cell, or the interconnect routing associated with those scan cells, a Physical Failure Analysis process of that region could be performed for the suspected defect. As will be discussed below with reference to FIGS. 5C and 5D, by applying two additional test patterns to the reversible scan chain 500, a directionality of a suspected defect can be ascertained and additionally reduce a target region for inspection in the Physical Failure Analysis process.

Figure 5C:
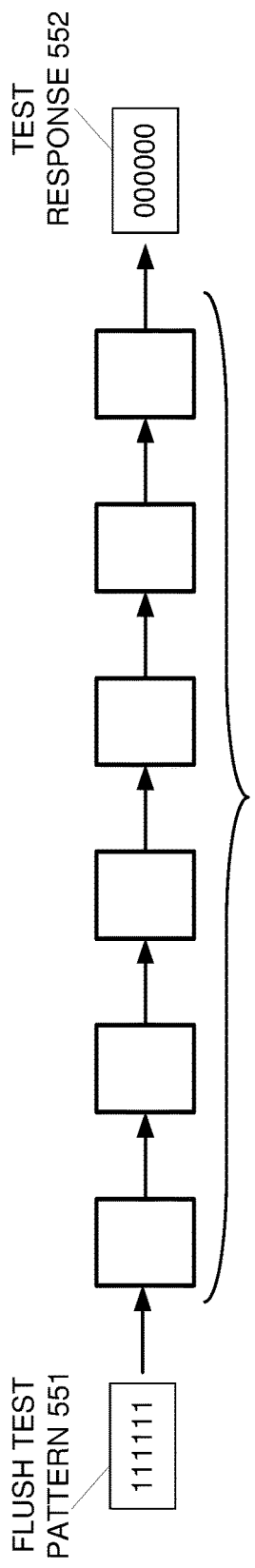

Referring to FIG. 5C, the reversible scan chain 500 can be loaded and unloaded with a left-to-right flush process, which loads a test pattern 551 from left-to-right into the reversible scan chain 500 and unloads a test response 552 from left-to-right in the reversible scan chain 500. In this example, the test pattern 551 can correspond to a "111111" pattern and the test response 552 can correspond to a "000000" pattern, which can indicate the left-to-right lane of the reversible scan chain 500 includes a stuck-at 0 defect.

Figure 5D:
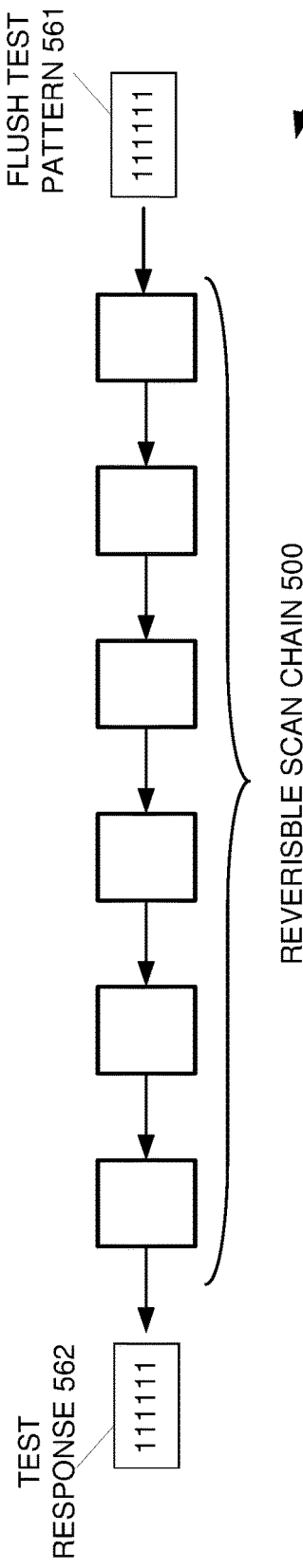

Referring to FIG. 5D, the reversible scan chain 500 can be loaded and unloaded with a right-to-left flush process, which loads a test pattern 561 from right-to-left into the reversible scan chain 500 and unloads a test response 562 from right-to-left in the reversible scan chain 500. In this example, the test pattern 561 can correspond to a "111111" pattern and the test response 562 can correspond to a "111111" pattern, which can indicate the right-to-left lane of the reversible scan chain 500 does not include a defect.

By performing the two flush processes—left-to-right flush process and the right-to-left flush process—a directionality of the suspected defect can be identified as a dual direction, a single direction from left-to-right, or a single direction from right-to-left. This direction associated with the suspected defect can allow for a reduction in a target region for inspection in the Physical Failure Analysis process. Embodiments of suspected defect target region reduction based on a directionality associated with the suspected defect will be described below in greater detail. Although FIGS. 5A-5C disclose example loading and unloading operations in a reversible scan chain, in some embodiments, the reversible scan chain can include one or more inverters, which can alter the test responses and subsequent defect diagnosis.

Referring back to FIG. 3, the defect diagnosis tool 320 can include a defect location unit 322 to determine a portion of a manufactured integrated circuit corresponding to the suspected defect associated with the reversible scan chain. The portion of the manufactured integrated circuit can be subsequently inspected during a Physical Failure Analysis process to identify a presence of any manufacturing faults corresponding to the suspected defect detected during testing. A ratio of actual manufacturing faults identified through the Physical Failure Analysis process relative to the suspected defects identified by the defect diagnosis tool 320 can correspond to a defect resolution of the defect diagnosis tool 320.

The defect location unit 322 can determine the portion of the manufactured integrated circuit corresponding to the suspected defect by identifying a region of the reversible scan chain associated with the suspected defect, for example, the left-most and right-most scan cells associated with the suspected defect determined using the U-turn processes, and then identifying a subset of the circuitry or interconnections within the identified region based on the failure detection type, for example, determined using the flush processes. Embodiments of determining the portion of the manufactured integrated circuit corresponding to the suspected defect will be described below with reference to FIGS. 6A-6D.

Figure 6A:
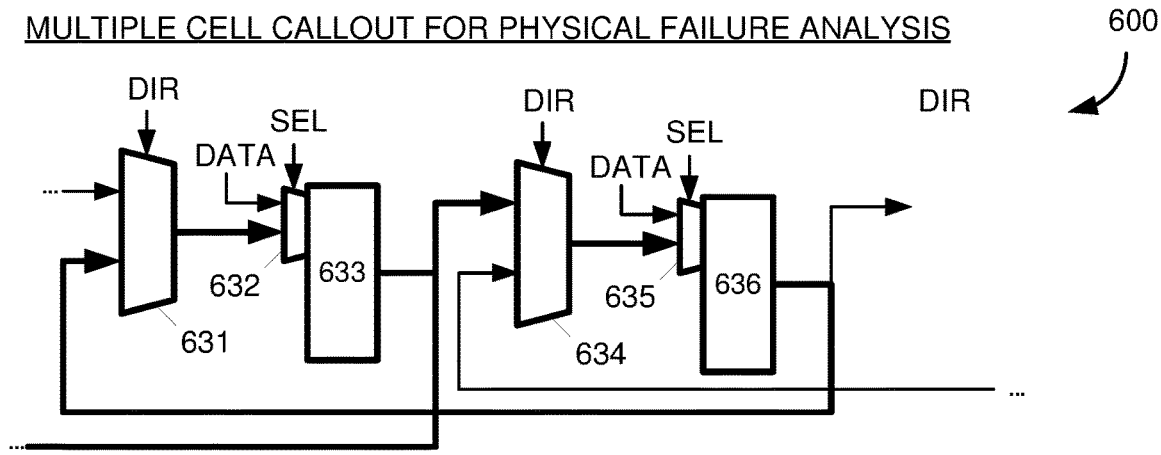
FIGS. 6A-6D illustrate example defect location identification based on lane-dependent defect detection in a reversible scan chain according to various embodiments.

FIGS. 6A-6D illustrate example defect location identification based on lane-dependent defect detection in a reversible scan chain according to various embodiments. Referring to FIG. 6A, a reversible scan chain 600 can include multiple scan cells 633 and 636 associated with a suspected defect has been identified through performance of the U-turn process. When a directionality of the suspected defect has not been determined, the reversible scan chain 600 can have a target region for the suspected defect that includes the scan cells 633 and 636, the output wires of the scan cells 633 and 636, test multiplexers 632 and 635, direction multiplexers 631 and 634, and the output wires of the direction multiplexers 631 and 634.

Figure 6B:
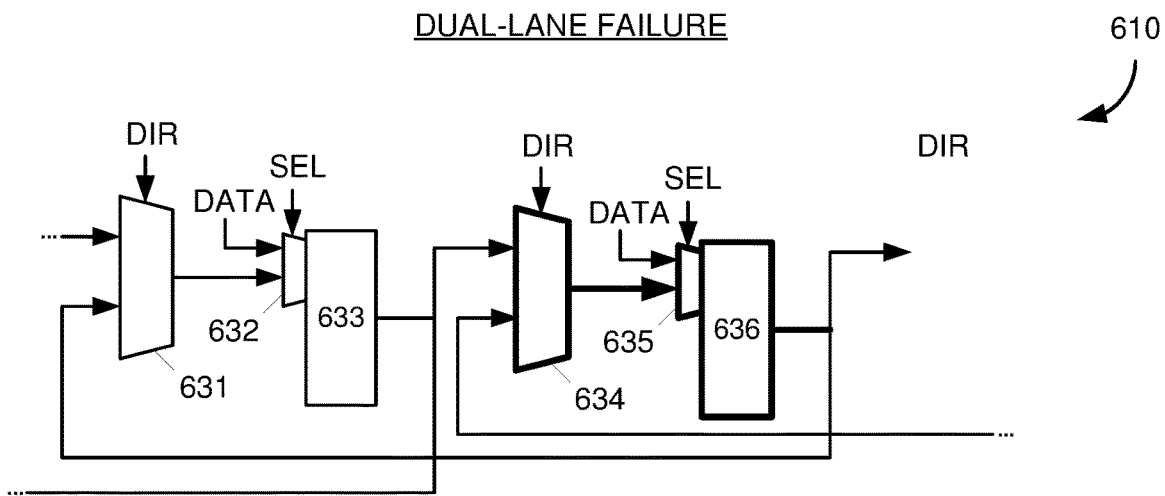

Referring to FIG. 6B, a reversible scan chain 610 can have a suspected defect corresponding to scan cells 633 and 636 identified through performance of the U-turn process. The reversible scan chain 610 also can have a failure directionality type corresponding to a dual-lane failure, for example, identified based on a flush pattern process. A dual-lane failure can indicate that the suspected failure could be detected regardless of the directionality—left-to-right or right-to-left—of a shift of test patterns in the reversible scan chain 610. For example, when both a left-to-right flush process and a right-to-left flush process could be used to detect a presence of the suspected defect, the suspected defect can correspond to a dual-lane failure.

The reversible scan chain 610 can have a target region for the suspected defect reduced relative to the target region in FIG. 6A due to the identification of the failure directionality type. In this example, the target region for the suspected defect in the reversible scan chain 610 can correspond to the scan cell 636, the output wire of the scan cell 636, the test multiplexer 635, direction multiplexer 634, and the output wire of the direction multiplexer 634. This reduction of the target region for the suspected defect can allow for a smaller area of inspection during a Physical Failure Analysis process than the target region described with reference to FIG. 6A.

Figure 6C:
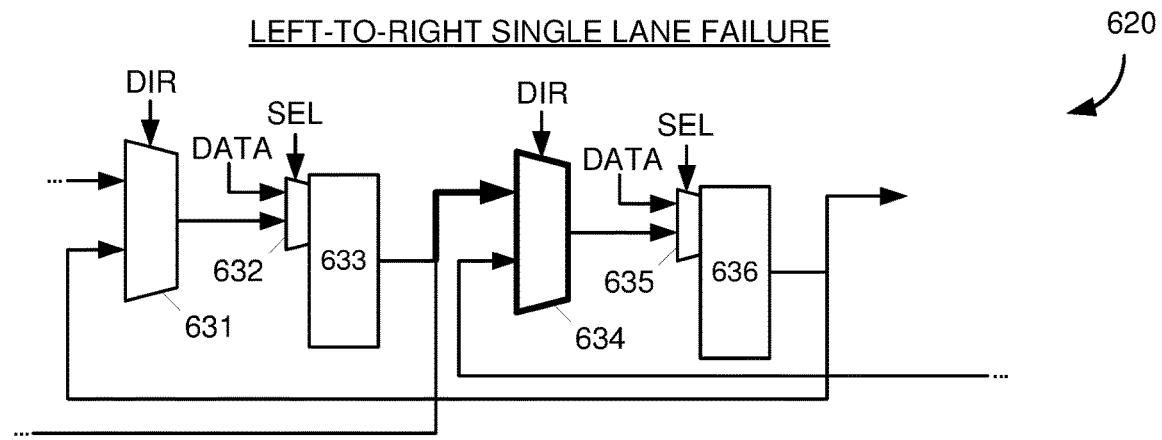

Referring to FIG. 6C, a reversible scan chain 620 can have a suspected defect corresponding to scan cells 633 and 636 identified through performance of the U-turn process. The reversible scan chain 620 also can have a failure directionality type corresponding to a left-to-right single lane failure, for example, identified based on a flush pattern process. A left-to-right single lane failure can indicate that the suspected failure occurred only when test patterns were shifted from left-to-right in the reversible scan chain 620. For example, when a left-to-right flush process could detect a suspected defect in the reversible scan chain 620, but a right-to-left flush process could not detect the suspected defect in the reversible scan chain 620, the suspected defect can correspond to a left-to-right single lane failure.

The reversible scan chain 620 can have a target region for the suspected defect reduced relative to the target region in FIG. 6A based on to the identification of the failure directionality type. In this example, the target region for the suspected defect in the reversible scan chain 620 can correspond to direction multiplexer 634, and an input wire of the direction multiplexer 634 corresponding to a left-to-right input test value. This reduction of the target region for the suspected defect can allow for a smaller area of inspection during a Physical Failure Analysis process than the target region described with reference to FIG. 6A.

Figure 6D:
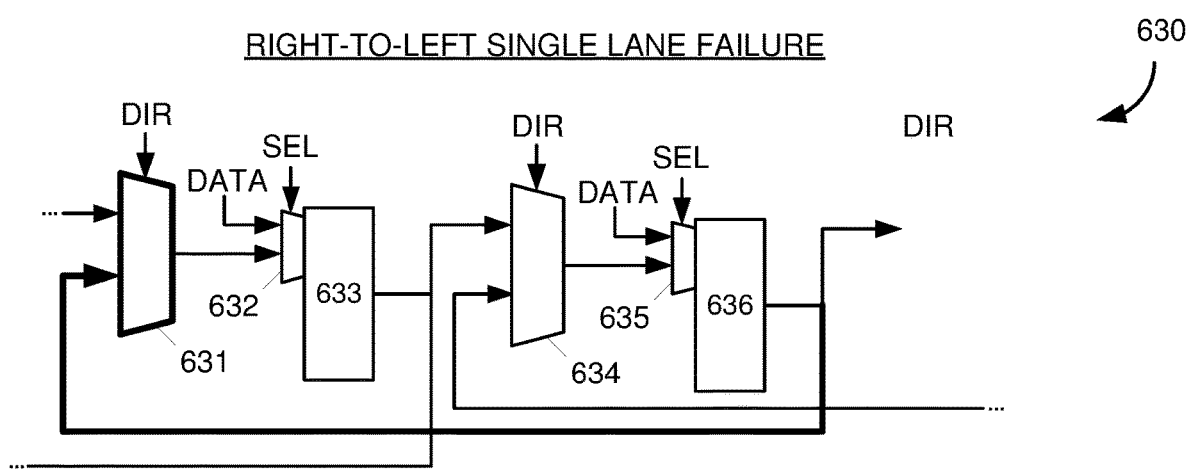

Referring to FIG. 6D, a reversible scan chain 630 can have a suspected defect corresponding to scan cells 633 and 636 identified through performance of the U-turn process. The reversible scan chain 630 also can have a failure directionality type corresponding to a right-to-left single lane failure, for example, identified based on a flush pattern process. A right-to-left single lane failure can indicate that the suspected failure occurred only when test patterns were shifted from right-to-left in the reversible scan chain 620. For example, when a right-to-left flush process could detect a suspected defect in the reversible scan chain 620, but a left-to-right flush process could not detect the suspected defect in the reversible scan chain 620, the suspected defect can correspond to a right-to-left single lane failure.

The reversible scan chain 620 can have a target region for the suspected defect reduced relative to the target region in FIG. 6A based on to the identification of the failure directionality type. In this example, the target region for the suspected defect in the reversible scan chain 620 can correspond to direction multiplexer 631, and an input wire of the direction multiplexer 631 corresponding to a right-to-left input test value. This reduction of the target region for the suspected defect can allow for a smaller area of inspection during a Physical Failure Analysis process than the target region described with reference to FIG. 6A.

Figure 7:
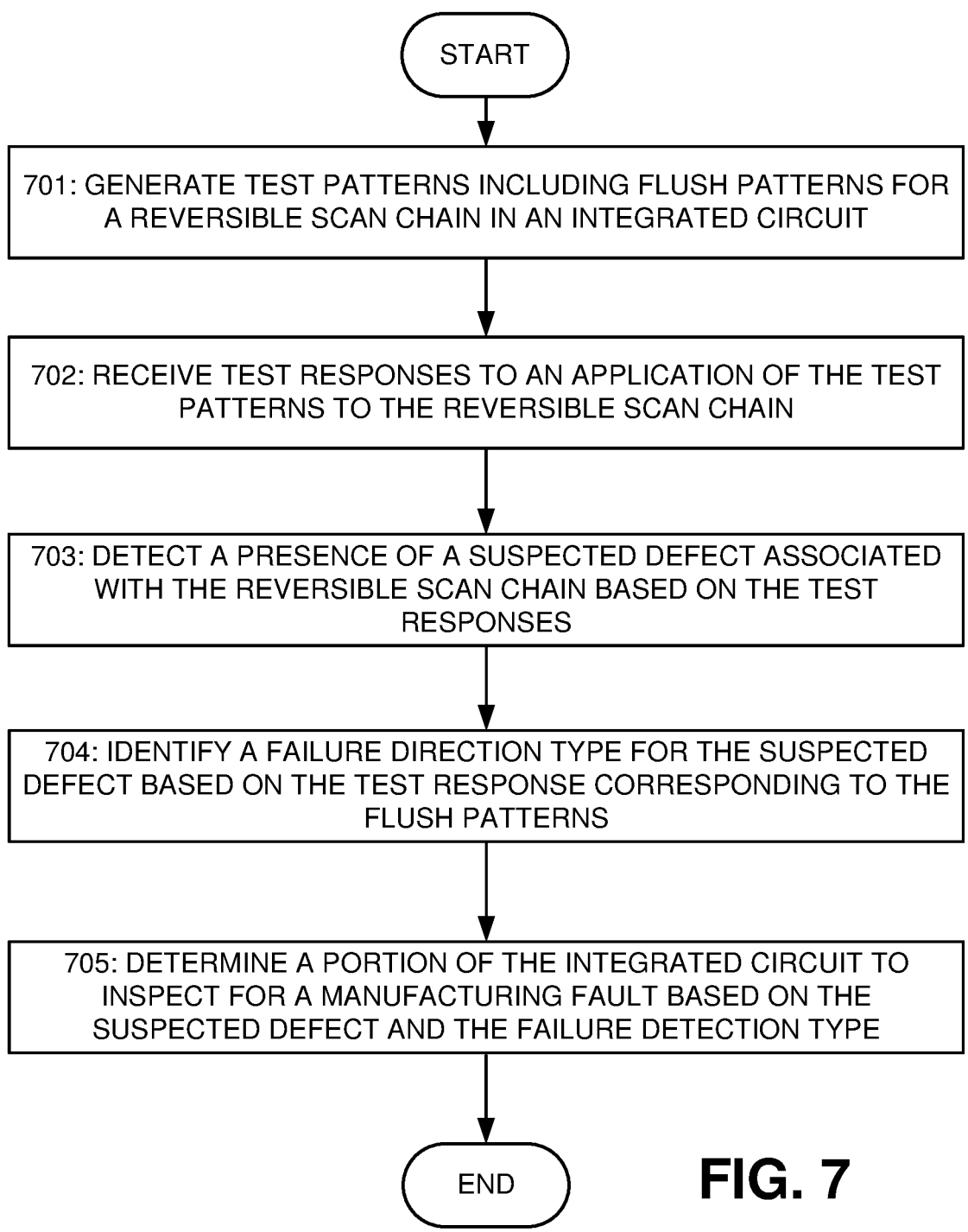
FIG. 7 illustrates a flowchart showing an example implementation of lane-dependent defect diagnosis in a reversible scan chain according to various examples.

FIG. 7 illustrates a flowchart showing an example implementation of lane-dependent defect diagnosis in a reversible scan chain according to various examples. Referring to FIG. 7, in a block 701, a computing system implementing an automatic test pattern generation tool can generate test patterns including flush patterns for a reversible scan chain in an integrated circuit. In some embodiments, the computing system can generate a test pattern file based, at least in part, on a circuit design corresponding to the integrated circuit, which can identify the test patterns to be serially loaded into and unloaded from one or more reversible scan chains in manufactured integrated circuit. For example, when attempting to determine a presence of a stuck-at 0 defect, the computing system can generate test patterns having values of "1" shifted through the reversible scan chain. When attempting to determine a presence of a stuck-at 1 defect, the computing system can generate test patterns having values of "0" shifted through the reversible scan chain.

The test pattern file also can identify a directionality of the loading of each test pattern and the unloading of each test pattern. The test pattern file can prompt the test patterns to be loaded and unloaded from the manufactured integrated circuit in a U-turn process. For example, the test pattern file can direct Automatic Test Equipment (ATE) to load a test pattern into a reversible scan chain of the manufactured integrated circuit and have the reversible scan chain shift the test pattern from left-to-right before unloading the test pattern from the reversible scan chain by shifting out a test response from right-to-left. The test pattern file also can prompt the test patterns to be loaded and unloaded from the manufactured integrated circuit in a flush process. For example, the test pattern file can direct the ATE to load a test pattern into a reversible scan chain of the manufactured integrated circuit and have the reversible scan chain shift the test pattern from left-to-right before unloading the test pattern from the reversible scan chain by shifting out a test response from left-to-right.

In a block 702, the computing system implementing a defect diagnosis tool can receive test responses to an application of the test patterns to the reversible scan chain. The computing system can receive a fail log file, for example, from the ATE having applied the test patterns described in the test pattern file. In some embodiments, the fail log file can include a list of test responses unloaded from a reversible scan chain that differ from the test patterns applied to a manufactured integrated circuit.

In a block 703, the computing system implementing the defect diagnosis tool detect a presence of a suspected defect associated with the reversible scan chain based on the test responses. The computing system can analyze the fail log file to ascertain which of the test responses indicate a presence of at least one suspected defect in the manufactured integrated circuit associated with a reversible scan chain. In some embodiments, the computing system can determine a left-most and a right-most scan cell in the reversible scan chain corresponding to the suspected defect using responses from test patterns applied to the reversible scan chain in a U-turn process, such as a left-to-right-to-left U-turn process and a right-to-left-to-right U-turn process. For example, a left-to-right-to-left U-turn process can load a test pattern to a reversible scan chain by shifting the test pattern left-to-right into the reversible scan chain and can unload a test response from right-to-left in the reversible scan chain. The left most difference in bit value between the test pattern and the test response can correspond to a left most scan cell associated with the suspected defect.

In a block 704, the computing system implementing the defect diagnosis tool identify a failure direction type for the suspected defect based on the test response corresponding to the flush patterns. The failure direction type can correspond to a right-to-left single lane failure when the suspect defect occurs only when the test pattern was shifted right-to-left in the reversible scan chain. The failure directionality type can correspond to a left-to-right single lane failure meaning the suspect defect occurs only when the test pattern was shifted left-to-right in the reversible scan chain. The failure directionality type can correspond to a dual-lane failure meaning the suspect defect occurs when the test pattern was shifted left-to-right and right-to-left in the reversible scan chain.

In some embodiments, the defect directionality detector can utilize the test patterns applied to the reversible scan chain in the flush processes, such as a left-to-right flush process and a right-to-left flush process to determine the failure direction type. When the computing system determines a suspect defect can be detected with only one of the flush processes, for example, the left-to-right flush process or the right-to-left flush process, the failure directionality type for the suspected defect can be a single-lane failure. When the computing system determines a suspect defect can be detected with both of the flush processes, for example, the left-to-right flush process and the right-to-left flush process, the failure directionality type for the suspected defect can be a dual-lane failure.

In a block 705, the computing system implementing the defect diagnosis tool determine a portion of the integrated circuit to inspect for a manufacturing fault based on the suspected defect and the failure detection type. The portion of the manufactured integrated circuit can be subsequently inspected during a Physical Failure Analysis process to identify a presence of any manufacturing faults corresponding to the suspected defect detected during testing. A ratio of actual manufacturing faults identified through the Physical Failure Analysis process relative to the suspected defects can correspond to a defect resolution of a defect diagnosis process.

The computing system can determine the portion of the manufactured integrated circuit corresponding to the suspected defect by identifying a region of the reversible scan chain associated with the suspected defect, for example, the left-most and right-most scan cells associated with the suspected defect determined using the U-turn processes described above in block 703, and then identifying a subset of the circuitry or interconnections within the identified region based on the failure detection type.

Figure 8:
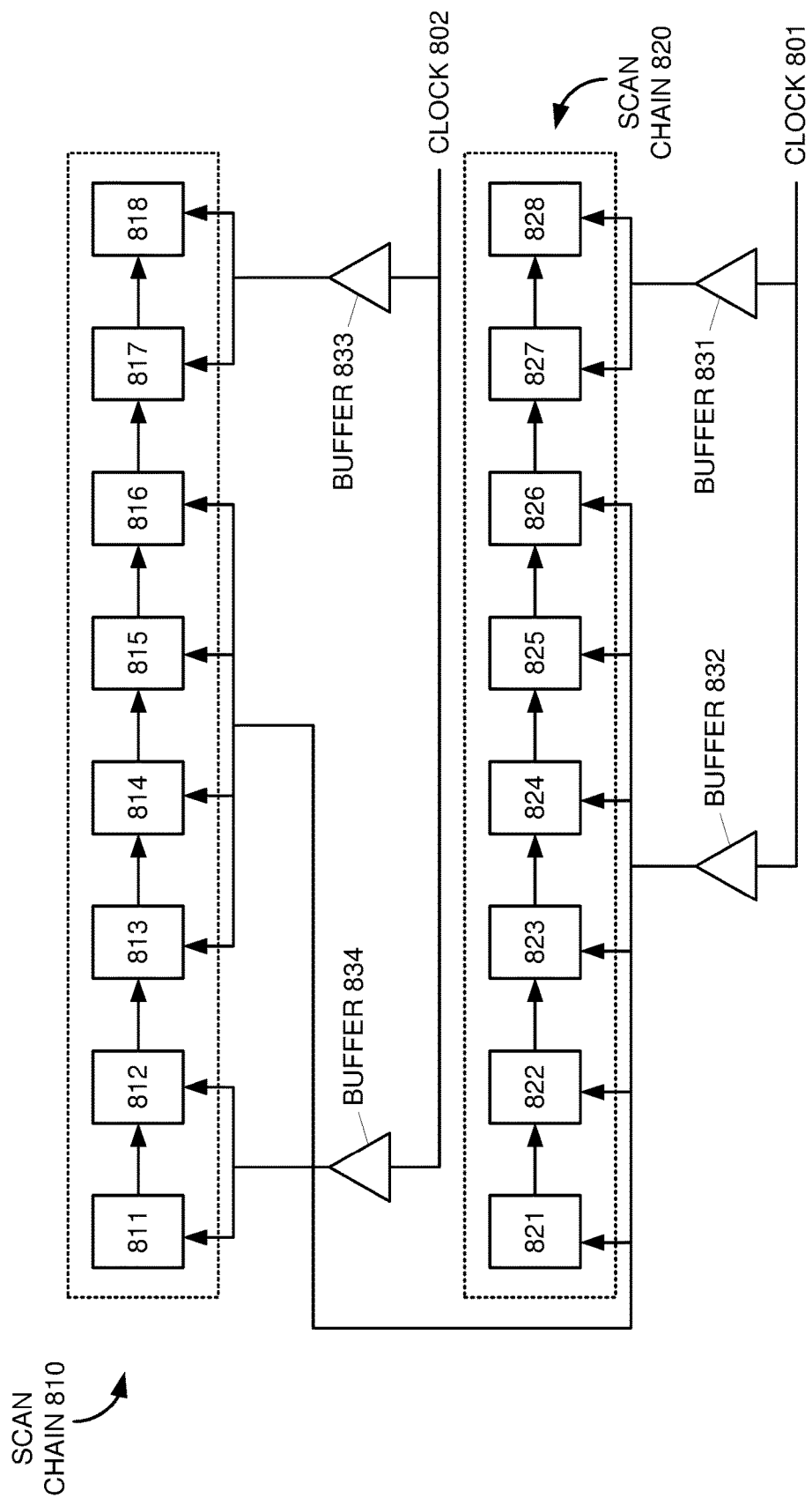
FIG. 8 illustrates example clock defect detection based on lane-dependent defects in a reversible scan chain according to various embodiments.

FIG. 8 illustrates example clock defect detection based on lane-dependent defects in reversible scan chains 810 and 820 according to various embodiments. Referring to FIG. 8, the reversible scan chain 810 can include scan cells 811-818 and the reversible scan chain 820 can include scan cells 821-828. The scan cells 811-818 and 821-828 can have multiple operational modes—a functional mode and a test mode. In the functional mode, the scan cells 811-818 and 821-828 can perform functions based, at least in part, on clocks 801 and 802. The clock 801 can be propagated to the scan cells 827 and 828 via a buffer 831, and be propagated to scan cells 821-826 and 813-816 via a buffer 832. The clock 802 can be propagated to the scan cells 811 and 812 via a buffer 834, and be propagated to scan cells 817 and 818 via a buffer 833.

In the test mode, the scan cells 811-818 and 821-828 for the reversible scan chains 810 and 820 can be configured for loading test patterns and unloading test responses. During the test mode, the reversible scan chains 810 and 820 can receive test patterns in a U-turn process, which can identify boundaries of any suspected defects in the reversible scan chains 810 and 820. For example, the U-turn process could detect suspected defects in reversible scan chain 810 between scan cells 813-816 and in reversible scan chain 820 between scan cells 821-826. Without knowing a directionality of failure, the target region of the suspected defect for inspection during a Physical Failure Analysis process could correspond to the scan cells 813-816 and 821-826, the interconnections between them, and a clock tree supplying the clock 801 to the scan cells 813-816 and 821-8266, specifically, buffer 832 that propagates the clock 801 to the scan cells 813-816 and 821-826.

During the test mode, the reversible scan chains 810 and 820 also can receive test patterns in a flush process, which can determine the directionality of failure for the suspected defects in the reversible scan chains 810 and 820. When the directionality of failure corresponds to a single-lane failure, the target region of the suspected defect for inspection during the Physical Failure Analysis process can be reduced to eliminate some scan cells and interconnections as well as a presence of slow clock defects, as those defect types would occur regardless of directionality of the reversible scan chains 810 and 820.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to design processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   generating, by a computing system, test patterns to apply to a reversible scan chain in an integrated circuit, wherein the reversible scan chain is configured to serially load and unload the test patterns in multiple directions to generate test responses;
   detecting, by the computing system, a presence of a suspected defect associated with the reversible scan chain based on the test responses;
   identifying, by the computing system, which of the multiple directions used to load and unload the test patterns corresponds to the suspected defect in the reversible scan chain based on the test responses; and
   determining, by the computing system, a portion of the integrated circuit to inspect for a manufacturing fault corresponding to the suspected defect based, at least in part, on the identification of which of the multiple directions corresponds to the suspected defect in the reversible scan chain.

2. The method of claim 1, wherein the reversible scan chain is configured to serially load and unload a first test pattern in a first direction to generate a first test response and configured to serially load and unload a second test pattern in a second direction to generate a second test response, wherein identifying which of the multiple directions corresponds to the suspected defect in the reversible scan chain further comprises utilizing the first test response and the second test response to identify a failure direction type for the reversible scan chain.

3. The method of claim 2, wherein the failure direction type corresponds to one of a dual-lane failure when both the first test response and the second test response indicate the presence of the suspected defect associated with the reversible scan chain or a single lane failure when only one of the first test response and the second test response indicate the presence of the suspected defect associated with the reversible scan chain.

4. The method of claim 1, wherein the reversible scan chain is configured to serially load a first test pattern in a first direction and unload the first test pattern in a second direction to generate a first test response and serially load a second test pattern in the second direction and unload the second test pattern in the first direction to generate a second test response, and wherein detecting the presence of the suspected defect is based, at least in part, on the first test pattern and the second test pattern.

5. The method of claim 1, wherein determining the portion of the integrated circuit to inspect for the manufacturing fault corresponding to the suspected defect is based, at least in part, on the identification of which of the multiple directions corresponds to the suspected defect in the reversible scan chain.

6. The method of claim 1, wherein detecting the presence of the suspected defect associated with the reversible scan chain further comprises detecting a type of the suspected defect based on the test patterns and the test responses.

7. The method of claim 6, wherein the type of the suspected defect corresponds to a stuck-at one defect, a stuck-at zero defect, or a slow clock defect.

8. A system comprising:
a memory system configured to store computer-executable instructions; and
a computing system, in response to execution of the computer-executable instructions, is configured to:
generate test patterns to apply to a reversible scan chain in an integrated circuit, wherein the reversible scan chain is configured to serially load and unload the test patterns in multiple directions to generate test responses;
detect a presence of a suspected defect associated with the reversible scan chain based on the test responses;
identify which of the multiple directions used to load and unload the test patterns corresponds to the suspected defect in the reversible scan chain based on the test responses; and
determine a portion of the integrated circuit to inspect for a manufacturing fault corresponding to the suspected defect based, at least in part, on the identification of which of the multiple directions corresponds to the suspected defect in the reversible scan chain.

9. The system of claim 8, wherein the reversible scan chain is configured to serially load and unload a first test pattern in a first direction to generate a first test response and configured to serially load and unload a second test pattern in a second direction to generate a second test response, and wherein the computing system, in response to execution of the computer-executable instructions, is further configured to utilize the first test response and the second test response to identify a failure direction type for the reversible scan chain.

10. The system of claim 9, wherein the failure direction type corresponds to one of a dual-lane failure when both the first test response and the second test response indicate the presence of the suspected defect associated with the reversible scan chain or a single lane failure when only one of the first test response and the second test response indicate the presence of the suspected defect associated with the reversible scan chain.

11. The system of claim 8, wherein the reversible scan chain is configured to serially load a first test pattern in a first direction and unload the first test pattern in a second direction to generate a first test response and serially load a second test pattern in the second direction and unload the second test pattern in the first direction to generate a second test response, and wherein the computing system, in response to execution of the computer-executable instructions, is further configured to detect the presence of the suspected defect based, at least in part, on the first test pattern and the second test pattern.

12. The system of claim 8, wherein the computing system, in response to execution of the computer-executable instructions, is further configured to determine the portion of the integrated circuit to inspect for the manufacturing fault corresponding to the suspected defect based, at least in part, on the identification of which of the multiple directions corresponds to the suspected defect in the reversible scan chain.

13. The system of claim 8, wherein the computing system, in response to execution of the computer-executable instructions, is further configured to detect a type of the suspected defect based on the test patterns and the test responses.

14. An apparatus comprising at least one computer-readable memory device storing instructions configured to cause one or more processing devices to perform operations comprising:
generating test patterns to apply to a reversible scan chain in an integrated circuit, wherein the reversible scan chain is configured to serially load and unload the test patterns in multiple directions to generate test responses;
detecting a presence of a suspected defect associated with the reversible scan chain based on the test responses;
identifying which of the multiple directions used to load and unload the test patterns corresponds to the suspected defect in the reversible scan chain based on the test responses; and
determining a portion of the integrated circuit to inspect for a manufacturing fault corresponding to the suspected defect based, at least in part, on the identification of which of the multiple directions corresponds to the suspected defect in the reversible scan chain.

15. The apparatus of claim 14, wherein the reversible scan chain is configured to serially load and unload a first test pattern in a first direction to generate a first test response and configured to serially load and unload a second test pattern in a second direction to generate a second test response, and wherein the instructions are configured to cause one or more processing devices to perform operations further comprising utilizing the first test response and the second test response to identify a failure direction type for the reversible scan chain.

16. The apparatus of claim 15, wherein the failure direction type corresponds to one of a dual-lane failure when both the first test response and the second test response indicate the presence of the suspected defect associated with the reversible scan chain or a single lane failure when only one of the first test response and the second test response indicate the presence of the suspected defect associated with the reversible scan chain.

17. The apparatus of claim 14, wherein the reversible scan chain is configured to serially load a first test pattern in a first direction and unload the first test pattern in a second direction to generate a first test response and serially load a second test pattern in the second direction and unload the second test pattern in the first direction to generate a second test response, and wherein the instructions are configured to cause one or more processing devices to perform operations further comprising detecting the presence of the suspected defect based, at least in part, on the first test pattern and the second test pattern.

18. The apparatus of claim 14, wherein the instructions are configured to cause one or more processing devices to perform operations further comprising determining the portion of the integrated circuit to inspect for the manufacturing fault corresponding to the suspected defect based, at least in part, on the identification of which of the multiple directions corresponds to the suspected defect in the reversible scan chain.

19. The apparatus of claim 14, wherein the instructions are configured to cause one or more processing devices to perform operations further comprising detecting a type of the suspected defect based on the test patterns and the test responses.

20. The apparatus of claim 19, wherein the type of the suspected defect corresponds to a stuck-at one defect, a stuck-at zero defect, or a slow clock defect.

\* \* \* \* \*